United States Patent [19]
Daghe

[11] 3,957,245
[45] May 18, 1976

[54] GATE VALVE STRUCTURE
[75] Inventor: Joseph L. Daghe, Decatur, Ill.
[73] Assignee: Mueller Co., Decatur, Ill.
[22] Filed: Nov. 26, 1974
[21] Appl. No.: 527,492

[52] U.S. Cl. .............................. 251/214; 137/375; 251/267; 251/326
[51] Int. Cl.² .................. F16K 27/00; F16K 31/50; F16K 3/00
[58] Field of Search ........... 251/214, 266, 267, 268, 251/269, 326, 327, 328; 137/375

[56] References Cited
UNITED STATES PATENTS

| | | |
|---|---|---|
| 3,633,873 | 1/1972 | Leopold, Jr. et al. ............. 251/326 |
| 3,662,778 | 5/1972 | Leopold, Jr. et al. ............. 251/267 |
| 3,763,880 | 10/1973 | Leopold, Jr. et al. ............. 251/214 |
| 3,809,363 | 5/1974 | Rhodes ............................. 251/266 |

FOREIGN PATENTS OR APPLICATIONS
1,252,494   10/1967   Germany ............................ 251/269

Primary Examiner—Martin P. Schwadron
Assistant Examiner—G. L. Walton
Attorney, Agent, or Firm—Cushman, Darby & Cushman

[57] ABSTRACT

A gate valve structure for use in mains carrying fluid, such as water mains or the like, the gate valve structure having a non-rising stem-type actuating mechanism. The gate valve structure includes a hollow gate member having a chamber therein open to the exterior and a valve stem which extends through the valve casing to the exterior thereof, the valve stem having exterior threads cooperating with interior threads carried by the gate member and the arrangement being such that the threads of the valve stem are completely protected from water and foreign material, such as dirt and abrasives and the like, when the gate member is in its completely opened position. This arrangement reduces torque necessary to operate the valve to the closed position.

9 Claims, 3 Drawing Figures

GATE VALVE STRUCTURE

The present invention relates to an improved gate valve structure and, more particularly, to a gate valve structure of the type having a non-rising valve stem, a gate member which is hollow and into which the stem is telescoped when the gate member is moved from a fully closed position to a fully opened position. Sealing means are provided between the valve stem and the gate member to fully isolate the threads of the valve stem from water or other fluids flowing through the valve structure when the valve structure is fully opened, thereby eliminating problems of corrosion to the valve stem when the gate valve structure is infrequently used and left in the fully opened position for long periods of time.

BACKGROUND OF THE INVENTION

Heretofore, gate valve structures for use in fluid distribution systems having a corrosive promoting fluid flowing therethrough, such as water or the like, and utilizing a non-rising valve stem did not provide means to seal the threads of the valve stem from the fluid when the gate member of the valve was in the fully opened position. With fluids such as water, the presence of oxygen in the water acted as a corrosive catalyst and, consequently, the threads of the valve stem became corroded in time and, thus, increased the torque necessary to close the valve or subsequently open the valve. More recently, gate valve structures have been designed to provide a corrosion resistant coating on the threads of the valve stem or in some instances to provide sealing means between the gate member and the valve stem which would prevent fluid from coming into contact with the threads of the stem when the gate member of the valve was in the fully opened position. The latter-mentioned of the two above arrangements usually required the entire gate member or at least a portion thereof surrounding the valve stem to be coated with a resilient material, which resilient material would engage an interior surface of the valve casing or the under surface of the thrust collar of the valve stem in the fully opened position. Even more recently, gate valve structures have been designed wherein the threads on the gate member and on the valve stem have been protected against corrosion by sealing means, which sealing means was effective in any position of the valve, including and between fully closed position and fully opened position. This latter-mentioned type of gate valve structure was costly to manufacture and required the valve stem to be provided with an upper portion having interior threads and a lower portion carried within the hollow gate member and having exterior threads cooperating with the interior threads of the upper portion.

Gate valve structures used in water distribution systems and in other fluid distribution systems wherein the fluid can cause corrosion to the interior of the valve structure and its working parts are generally not operated frequently. In other words, a gate valve in a water distribution system, once the system has been completed, is usually opened and left open for great lengths of time until it is necessary to repair the system downstream of the gate valve structure or it is necessary to shut off water downstream of the same to a particular point of use. As mentioned above, the presence of oxygen in the water acts as a corrosive catalyst and aids in the formation of corrosion of the internal parts of the gate valve and it is necessary to provide a positive means to prevent the water from engaging the threads on the valve stem when the valve is fully open. When the valve is fully open, there is the greatest passage of fresh water through the valve and, consequently, it is at this time the stem threads on the valve should be protected. When the gate valve structure is closed, there will be no flow of water through the valve structure with the gate member making a seal with the valve seat and, thus, sealing off the valve actuating mechanism to prevent corrosion. Of course, when the valve begins to open, there is some water which engages the valve stem, but, of course, the valve stem is receiving the gate member and, consequently, it is only necessary to provide a seal when the gate member gets into the fully opened position. This arrangement, even though the valve is not operated frequently, will make the valve operation easier as it prevents corrosion.

PRIOR ART

The following patents represent prior art patents disclosing gate valve structures wherein threads of the valve stem are protected from corrosion or grit by either protecting the same when the gate member is fully opened or by protecting the same during the entire operation of the gate member between the fully opened position and the fully closed position.

| | | |
|---|---|---|
| 1,557,926 | Dopp | Oct. 20, 1925 |
| 3,006,597 | Hookway | Oct. 31, 1961 |
| 3,032,310 | Hansen | May 1, 1962 |
| 3,633,873 | Leopold et al | Jan. 1, 1972 |
| 3,662,778 | Leopold et al | May 16, 1972 |

BRIEF SUMMARY OF THE INVENTION

The gate valve structure of the present invention is primarily utilized in mains carrying fluid under pressure, such as water mains. More specifically, the gate valve structure includes a valve casing having a through-bore, an elongated chamber intersecting the through-bore to define inlet and outlet ports in the through-bore to the chamber and a valve seat surrounding at least one of the ports in the through-bore. A gate member is provided with a chamber open to the exterior thereof by a bore, the gate member being slidable in the valve casing chamber from a closed position across the through-bore and seating against the valve seat to an opened position out of the through-bore. Valve actuating means are provided for moving the gate member, these means including a non-rising valve stem extending through the bore in and out of the valve casing, the non-rising valve stem having exterior threads which cooperate with interior threads provided on the gate member. The non-rising valve stem is provided with a cylindrical surface above its threads, but beneath its thrust collar, whereas the gate member is also provided with an annular smooth cylindrical surface above its interior threads and one of said cylindrical surfaces has a groove therein for receiving sealing means, the sealing means sealing between the valve stem and the gate member when the gate member is in the fully opened position and the cylindrical surface in the gate member has telescopingly received the cylindrical surface on the valve stem.

Another aspect of the present invention is to provide an annular bushing fixedly supported in the bore of the gate member, the bushing having the interior threads and the cylindrical surface outwardly thereof for respectively cooperating with the exterior threads of the valve stem and the cylindrical surface on the valve stem above the exterior threads. A further aspect of the present invention is to provide a gate valve structure having a non-rising stem actuating means, the non-rising stem actuating means having a cylindrical surface thereon positioned beneath the thrust collar thereof, the cylindrical surface being arranged to telescope within a complementary cylindrical surface on the gate member and the groove being provided with an O-ring so that a seal is made between the gate member and the valve stem only when the gate member is in the fully opened position. This arrangement effectively eliminates or reduces corrosion on the operating threads of both the gate member and the valve stem and, thus, the gate valve structure may be left in the opened position for extended periods of time.

While the present invention is disclosed in a gate valve structure wherein a valve housing is provided that comprises two body members split in a plane normal to the axis of the through-bore, the invention may be fully utilized in a gate valve structure of the type wherein the valve casing comprises a body member including the entire through-bore and a bonnet covering the body member and defining therewith a chamber in which the gate member is reciprocally moved, the chamber intersecting the through-bore of the body member. Such a gate valve construction is shown in the common Assignee's prior U.S. Pat. No. 3,662,778, issued May 16, 1972 and referred to above.

DETAILED DESCRIPTION OF THE DRAWINGS

Figure 1:
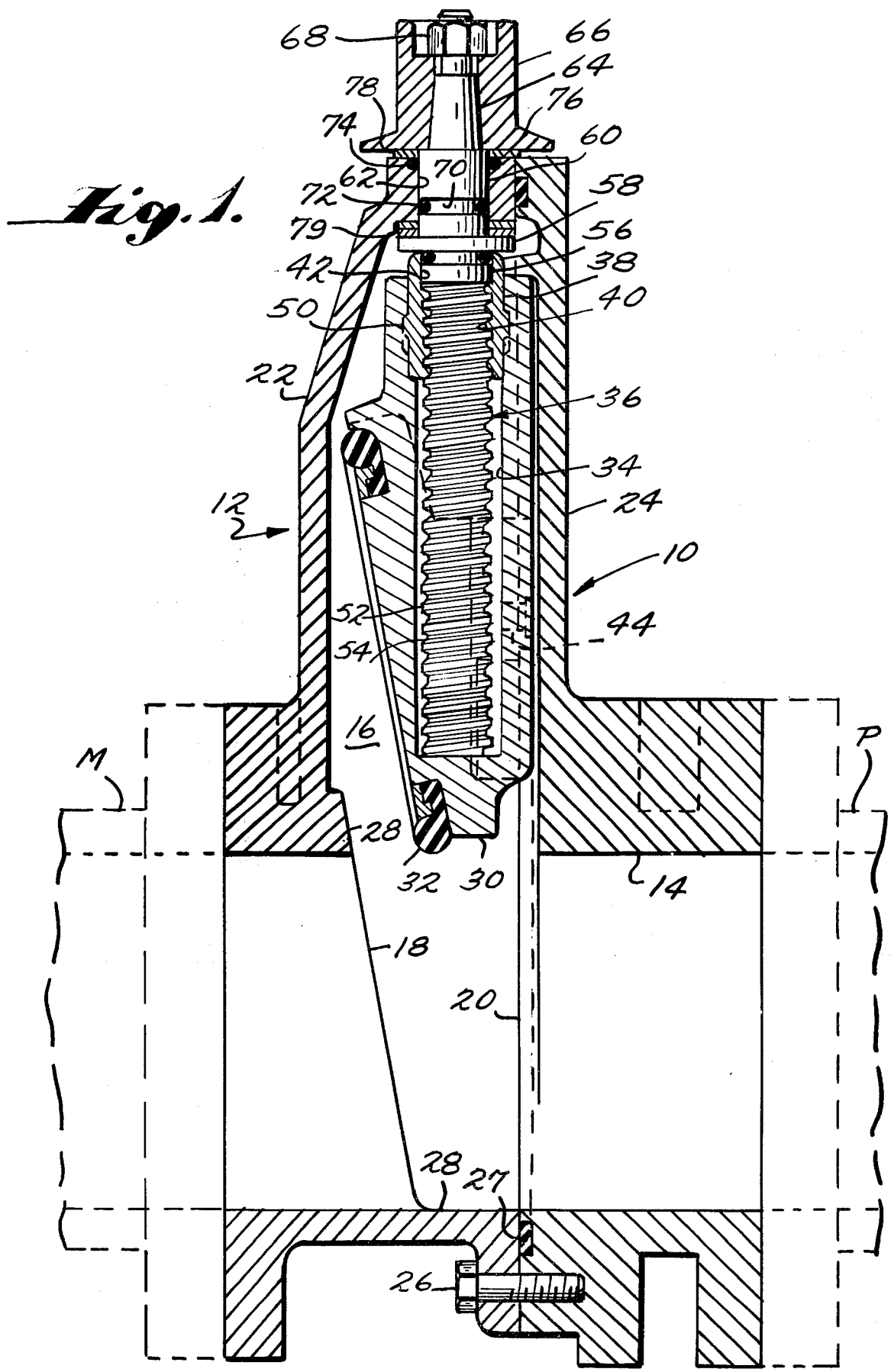
FIG. 1 is a vertical sectional view through the gate valve structure taken on a plane parallel to and through the axis of the through-bore with the valve stem shown in elevation for purpose of clarity, the view illustrating the gate member in the fully opened position and the sealing means between the gate member and the valve stem being operable to seal the threads of the valve stem and the interior of the gate member from fluid passing through the gate valve structure.
Figure 2:
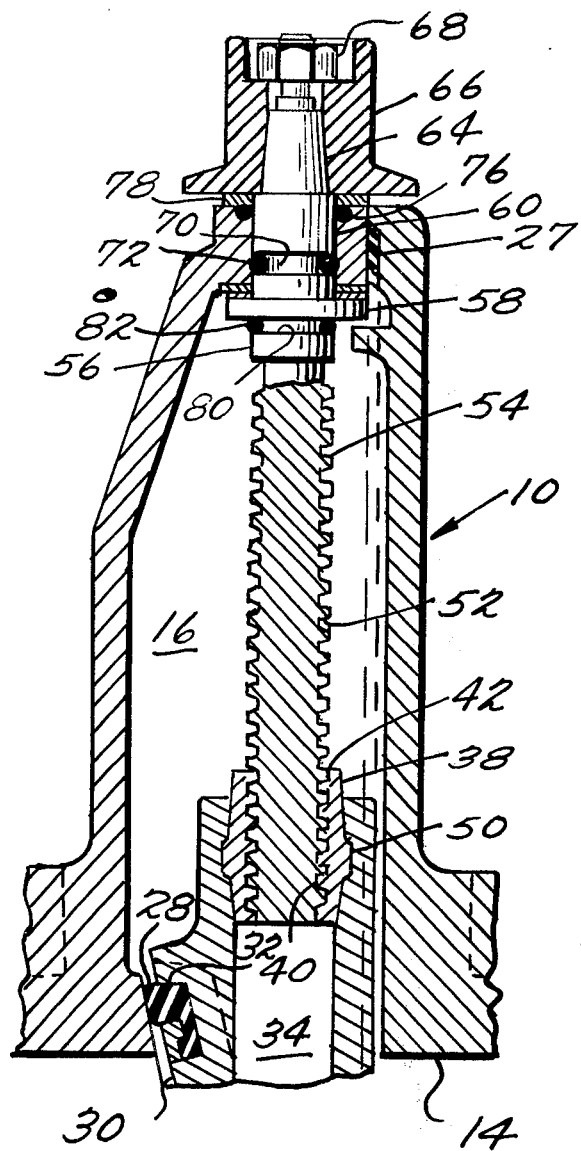
FIG. 2 is a fragmentary vertical sectional view similar to FIG. 1 and partly in elevation, but illustrating the gate member in the fully opened position.

Referring to the drawings wherein like characters or reference numerals represent like or similar parts, the gate valve structure of the present invention is generally designated by the numeral 10 in FIGS. 1 and 2. In more detail, the gate valve structure, as disclosed, is of the type shown in the co-pending U.S. application Ser. No. 527,493 of Frank C. Hackman, Lawrence F. Luckenbill, and Joseph L. Daghe, filed Nov. 26, 1974, and the disclosure of which is incorporated herein by reference. However, for the purpose of clarity of the present disclosure, certain major details of the structure will be repeated herein.

The gate valve structure 10, which may be connected in any suitable manner to the mains or pipes M and P of a fluid distribution system, comprises a valve casing, generally designated at 12, the valve casing having a through-bore 14 for the passage of fluid therethrough and a chamber 16 intersecting the through-bore 14 and defining ports 18 and 20 in the through-bore to the chamber. The ports 18 and 20 may be inlet or outlet ports to the chamber 16, depending upon which way the gate valve is inserted into the fluid distribution system as pressure of fluid in the system does not affect the sealing of the valve upon closing of the valve structure or affect opening of the valve as the design of the valve is such that the torque required for these operations is a mimimum for gate valves.

The valve casing 12 is formed from two disc-shaped or shell-like body members 22 and 24, the body members being attached to one another on a plane normal to the axis of the through-bore 14 by suitable bolt means 26 (one of which is shown in FIG. 1). A gasket seal 27 carried in a groove in one of the mating faces of body members 22 and 24 provides a seal between the same. While the present invention is disclosed in the environment of a valve structure having the valve casing formed of two body members arranged to be attached to each other on a plane normal to the axis of the through-bore, the invention is not limited to this type of gate valve structure, but may be used in other gate valve structures, such as the gate valve structure shown in the common Assignee's U.S. Pat. No. 3,662,778, issued May 16, 1972 to Leopold et al. In other words, the valve casing may be of the type which includes a body member containing the entire through-bore, the body member being closed by a bonnet member with the valve actuating means extending through the bonnet member. The disclousre of U.S. Pat. No. 3,662,778, which discloses such a valve structure, is incorporated herein by reference.

A valve seat 28 surrounds at least one of the ports 18 and 20 of the through-bore 14 and cooperating with the valve seat 28 is a gate or disc member 30 having a resilient annular seal means 32 thereon for engaging the valve seat 28. The gate member 30 is hollow and is provided with a chamber 34 therein closed at its lower end and open at its upper end for reception of a valve stem operating mechanism generally designated at 36.

Figure 3:
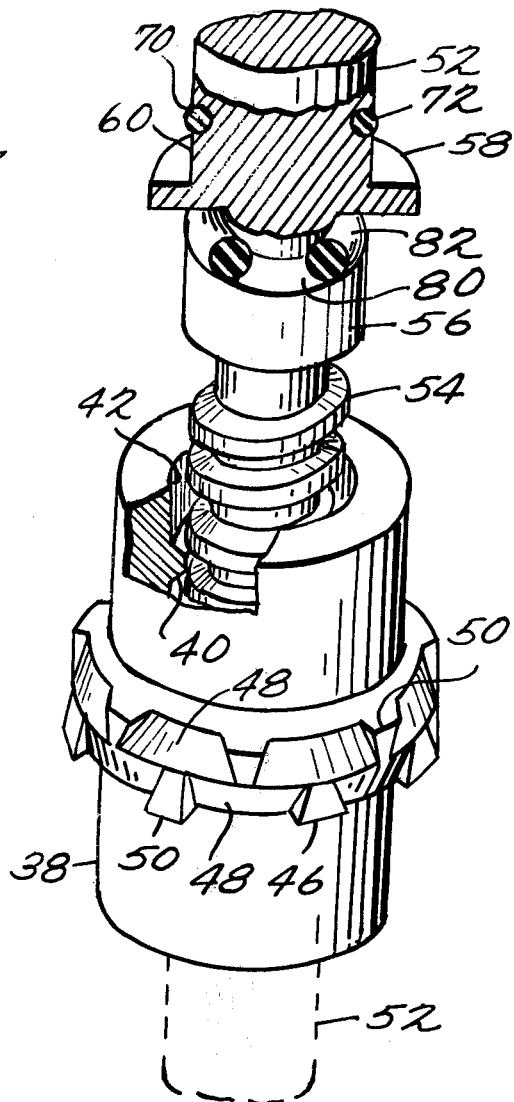
FIG. 3 is a fragmentary perspective view, partly in section and illustrating the bushing of the gate member moving on the valve shaft toward a position where a seal will be formed between the valve shaft and the bushing.

In more detail, the upper end of the chamber 34 is provided with an annular bushing 38, preferably made of brass, the bushing being integrally cast into place when the body of the gate member 30 is cast. As best shown in FIGS. 1 and 2, the bushing 38 is provided with interior threads 40 extending along a portion of its bore from the bottom thereof and terminating short of the top thereof. Outwardly and above the threads 40, the bushing is provided with an interior cylindrical surface 42 having a diameter at least as great as the major diameter of the threads 40, the purpose of the cylindrical surface being defined later in this specification. Since the gate member 30 is hollow, it is necessary to provide the same with at least one expansion or freeze plug 44 and, preferably, the plug 44 is inserted into and seals the core support hole which is left in the body member 30 when the body member is cast with the bushing 38 integrally therein. It will be noted by reference to FIG. 3 that the bushing 38 is provided with an annular shoulder 46 having a plurality of recesses 48 circumferentially spaced and axially spaced around the same, the recesses 48 defining luglike elements 50 therebetween. The lug-like elements 50, which project radially from the annular bushing 38, function as means to prevent relative rotational and axial movement between the bushing 38 and the cast body of the gate member 30.

As will be understood, the gate member 30 is provided with oppositely disposed ears (not shown) on its sides, the ears projecting outwardly and riding in vertically extending guideways in the valve casing 12. The ears permit rectilinear motion of the gate member 30 between a closed position where the gate member 30 extends across the through-bore 14 to an opened position where the gate member has moved upwardly completely out of the through-bore and into the upper part of the chamber 16.

The valve stem operating mechanism 36 includes a valve stem 52 having exterior threads 54 on its lower portion cooperating with the interior threads 40 of the annular bushing 38, a cylindrical portion 56 immediately above the exterior threads 54, an annular shoulder 58 defining a thrust collar which operatively bears against the interior of the valve casing 12, a second cylindrical portion 60 extending through a bore 62 in the valve casing 12, and an end portion 64 of non-circular configuration extending out of the valve casing. Attached to the end portion 64 is an operating nut 66 having a non-circular bore therethrough complementary to the end portion 64 and a nut 68 carried on the upper end retains the valve stem 52 in position for rotary movement without axial movement. In more detail, an annular groove 70 is provided on the upper cylindrical portion 60 of the valve stem 52, the groove 70 receiving an O-ring 72 which makes a seal between the valve casing and the valve stem. A counterbore 74 is provided at the upper end of the bore 62 and it receives an O-ring seal 76, the O-ring seal being held in position by an anti-friction washer 78 positioned between the operating nut 66 and the upper end of the valve casing 12. At least one anti-friction washer 79 is provided between the shoulder or thrust collar 58 and the interior surface of the valve casing.

The lower cylindrical surface 56 of the valve stem 52 is provided with an annular groove 80, preferably positioned just beneath the lower surface of the thrust collar 58, and an annular seal 82, preferably an O-ring, is carried in the groove 80. The diameter of the lower cylindrical portion 56 of the valve stem 12 is no greater than the diameter of the cylindrical surface 42 of the annular bushing 38 so that the cylindrical portion 56 may telescope within the cylindrical surface 42.

When the gate member 30 is in the closed position, as shown in FIG. 2, its seal member 32 will seal against the valve seat 28 and the exterior threads 54 of the valve stem 52 are exposed to the interior of the upper portion of the chamber 16. However, when the valve structure is in this position, the valve stem 52 is not exposed to the flow of fresh water and, consequently, there will be little or no corrosive action taking place. When the gate member 30 is moved from the closed position of FIG. 2 to the opened position to permit the flow of water through the through-bore 14, there will be some contact of the exterior threads 54 of the valve stem 52 with the flowing water as the gate member moves upwardly. However, the threads 54 have close tolerance with the interior threads 40 of the annular bushing 38 and as the threads of the valve stem extend into the hollow chamber 34 of the gate member, they will no longer be in contact with the flow of water through the through-bore 14 as there is not sufficient time during the opening operation for seepage of water into the chamber 16 of the gate member 30. Once the gate member 30 has moved to its fully opened position, as shown in FIG. 1, the cylindrical portion 56 of the valve stem 52 telescopes into the cylindrical surface 42 of the annular bushing 38 with the O-ring 82 carried in the groove 80 also telescoping into the cylindrical surface 42 of the annular bushing 38. The O-ring 82 makes a positive seal between the annular bushing 38 and the valve stem 52 so that there is no chance of water seeping into the interior of the gate member 30 where it will corrode the exterior threads 54 of the valve stem 52.

By providing an arrangement wherein the exterior threads 54 are fully protected from water or other corrosive fluid when the valve is in the opened position, corrosion of the interior threads is restricted and, thus, when the valve is opened after long periods of remaining in the closed position, the torque necessary to close the valve does not increase.

The terminology used in this specification is for the purpose of description and not limitation, the scope of the invention being defined in the appended claims.

What is claimed is:

1. A gate valve structure for use in mains carrying fluid, said gate valve structure comprising:

a valve casing having a through-bore for the flow of fluid, said through-bore having an inlet end and an outlet end, an elongated chamber intersecting said through-bore intermediate its ends and defining inlet and outlet ports in said through-bore to the chamber, a valve seat surrounding at least one of said ports in said through-bore, and a bore in the valve casing to the exterior thereof;

a gate member having a chamber therein open to the exterior thereof by a bore, said gate member being slidable in the valve casing chamber from a closed position across said through-bore and seating against said valve seat to an opened position out of said through-bore;

means for moving said gate member between said closed and opened positions, said means including interior threads operatively positioned within the bore of the gate member chamber and a non-rising valve stem extending through and out of the valve casing bore, said non-rising valve stem including an annular shoulder defining a thrust collar and operatively bearing upon the interior of said casing, retaining means on a portion of said valve stem extending outwardly of said valve casing, seal means between said valve casing and a portion of said valve stem within said valve casing bore, and exterior threads on said valve stem cooperating with the interior threads of said gate member;

means to provide a seal between said valve stem and said gate member only when said gate member is in the fully opened position whereby the exterior threads on said valve stem are protected from fluid in the valve casing chamber, said last-mentioned means including an annular portion within the bore within said gate member outwardly of said interior threads and having a smooth cylindrical surface with a major diameter at least as great as a major diameter of said interior threads, said valve stem beneath said annular shoulder and above said exterior threads having a smooth cylindrical surface having a diameter no greater than the diameter of the cylindrical surface of the bore in said gate member, said cylindrical surface of said valve stem being arranged to telescope within the cylindrical surface of the bore in said gate member only when said gate member is in the fully opened position, an annular groove in one of said cylindrical surfaces and sealing means carried in said groove for sealing between said valve stem and said gate member only when said gate member is in the fully opened position.

2. A gate valve structure as claimed in claim 1 in which said sealing means carried in said groove for sealing between said valve stem and said gate member is an O-ring.

3. A gate valve structure as claimed in claim 1 in which said annular groove is in the cylindrical surface of said valve stem beneath said annular shoulder.

4. A gate valve structure as claimed in claim 3 in which said sealing means is an O-ring.

5. A gate valve structure as claimed in claim 1 in which said interior threads are provided in an annular bushing fixedly supported in the bore of said gate member, said annular bushing being provided with the smooth cylindrical surface outwardly of the interior threads for telescopingly receiving said smooth cylindrical surface of said valve stem beneath said annular shoulder only when said gate member is in the fully opened position.

6. A gate valve structure as claimed in claim 5 in which said bushing is made of brass.

7. A gate valve structure as claimed in claim 6 in which said annular groove is provided on said smooth cylindrical surface of said valve stem beneath said annular shoulder.

8. A gate valve structure as claimed in claim 7 in which said sealing means is an O-ring.

9. A gate valve structure as claimed in claim 8 in which said gate member is provided with at least one expansion plug between the gate member chamber and the exterior of the gate member.

\* \* \* \* \*